(No Model.) 6 Sheets—Sheet 1.

P. P. CRAVEN.
RING SPINNING FRAME.

No. 521,584. Patented June 19, 1894.

Witnesses
Harry Town
Franklin Howard Craven

Inventor
Phinehas Pearson Craven (No Model.) 6 Sheets—Sheet 2.
P. P. CRAVEN.
RING SPINNING FRAME.
No. 521,584. Patented June 19, 1894.

WITNESSES
Harry Town
Franklin Howard Craven

—INVENTOR—
Phinehas Pearson Craven (No Model.)  
6 Sheets—Sheet 3.

P. P. CRAVEN.  
RING SPINNING FRAME.

No. 521,584.  
Patented June 19, 1894.

Fig 10.

WITNESSES—  
Harry Tower  
Franklin Howard Craven.

—INVENTOR—  
Phinehas Pearson Craven (No Model.) 6 Sheets—Sheet 4.

P. P. CRAVEN.
RING SPINNING FRAME.

No. 521,584. Patented June 19, 1894.

WITNESSES
Harry Town
Franklin Howard Craven.

—INVENTOR—
Phinehas Pearson Craven

(No Model.)  6 Sheets—Sheet 6.

P. P. CRAVEN.
RING SPINNING FRAME.

No. 521,584.  Patented June 19, 1894.

Witnesses
Harry Jones
Franklin Howard Craven

Inventor
Phinehas Pearson Craven

UNITED STATES PATENT OFFICE.

PHINEHAS PEARSON CRAVEN, OF MANCHESTER, ENGLAND.

RING-SPINNING FRAME.

SPECIFICATION forming part of Letters Patent No. 521,584, dated June 19, 1894.

Application filed October 28, 1892. Serial No. 450,301. (No model.)

*To all whom it may concern:*

Be it known that I, PHINEHAS PEARSON CRAVEN, gentleman, a subject of the Queen of Great Britain, residing at 16 Devonshire Street, Ardwick, Manchester, in the county of Lancaster and Kingdom of Great Britain, have invented certain Improvements in or Connected with Ring-Spinning Frames, of which the following is a specification.

Fig. 9 is an end view of so much of a spinning machine as is necessary to illustrate the application of my invention thereto. Fig. 9$^A$ is a detail view in connection with Fig. 9. Fig. 12 is a front elevation of a spinning spindle with modifications. Fig. 13 is a transverse sectional elevation of same. Fig. 13$^A$ is a sectional plan on line 3—3 of Fig. 13. Fig. 14 is a reproduction of part of Fig. 9 with modifications. Fig. 15$^A$ is a detail view showing the traveler stem having an extension with a bearing finger thereon. Fig. 18 is a sectional plan on line 2—2 of Fig. 9.

Figure 1:
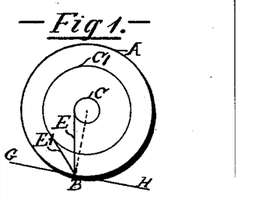
Figure 1 of the drawings is a diagram illustrating a defect in the ordinary ring spinning frame.
Figure 2:
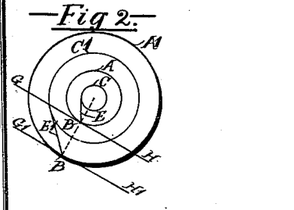
Fig. 2 a diagram illustrating the effect of my improved arrangement.
Figure 3:
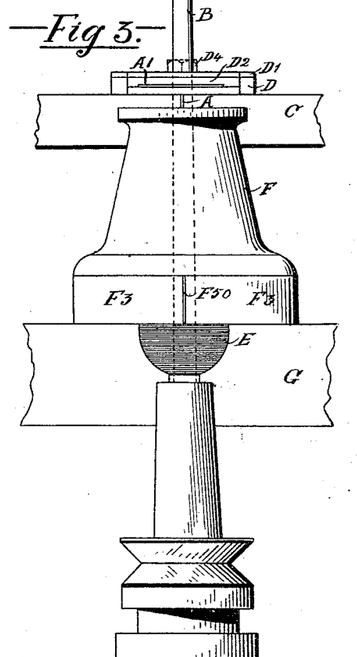
Fig. 3 is a front elevation of a spinning spindle with one part of my invention applied thereto.

Similar letters relate to like parts in each of the figures of the drawings except Figs. 1 and 2.

This invention relates more especially to ring spinning and doubling frames, that is to say spinning or doubling frames in which the winding of the yarn on to the bobbin, spool or spindle is effected by the friction of a traveler carried round a ring by the tension or drag of the yarn; but parts of such improvements are also applicable to other kinds of spinning and doubling frames.

It is well known that in ring spinning frames as at present constructed the tension or drag of the yarn, which in fact effects the winding on thereof on to the bobbin or spool, varies according as the yarn is being wound on to a small or large diameter; and when the yarn is being wound on to the bobbin, spool or spindle in cop form, this variation of tension or drag occurs during the winding on of each conical layer, so that for each layer of yarn the tension or drag is greater while winding on to the bare bobbin, spool or spindle than when winding on to the outer and larger diameter of the conical layer of yarn. It is found in practice that in order to avoid, on the one hand, too much tension or drag when winding on the smaller diameter, and too little when winding on the larger diameter, the diameter of the empty bobbin, spool or spindle must not be less than a certain dimension when it is required that the diameter of the full bobbin, spool or cop shall have a certain other dimension; because if the empty bobbin, spool or spindle be made of less diameter, and the tension or drag is sufficient to wind on tightly enough at the larger diameter, it is increased to such an extent that the yarn breaks when winding on at the smaller diameter. For this reason it is not, so far as I am aware, practicable to spin in ring frames, as at present constructed, on the bare spindles without limiting the external diameter of the cops to a size smaller than is desirable.

Figure 1 of the drawings is a diagram illustrating the above described defect in the ordinary ring spinning frame. A represents the ring, and B the traveler which is drawn round on the ring by the thread. The circle C represents the smallest circumference at the nose of the cop, and E the direction of the thread extending tangentially therefrom to the traveler B. The circle C' represents the largest circumference at the base of the cop chase, and E' the direction of the thread extending tangentially therefrom to the traveler B. It will be seen that the direction E of the thread from the circle C makes so great an angle with the tangent G H to the ring A that it could not draw the traveler B round, and would be broken in the effort to do so; but the direction E' of the thread from the circle C' makes so small an angle with the tangent G H that the traveler B would be drawn round with comparatively little tension on the thread.

Now the object of one part of this invention is to obviate the above-mentioned defects, and for that purpose I cause the traveler, or at least that point of the traveler through which the thread of yarn passes, or round which such thread is wound on its way from the drawing rollers to the bobbin, spool, or spindle, to be moved inward toward the center of the spindle, or outward away therefrom more or less in proportion as the diameter that the yarn is being wound on to varies, so that the tension or drag of the yarn may remain practically constant whether the yarn is being wound on to a small or large diameter. That is to say, that as the diameter that the yarn is being wound on to decreases, the traveler, or the point thereof through which the thread passes or round which such thread is wound, is moved inward toward the center of the spindle, and as that diameter increases, the traveler, or such point thereof as aforesaid is moved outward away from the center of the spindle. By these means the angle at which the yarn draws the traveler, with reference to the circumference of the ring, remains practically constant within certain limits whatever be the diameter on which the yarn is being wound.

Fig. 2 of the drawings is a diagram illustrating the effect of my improved arrangement. A represents the circle described by the point of the traveler when winding on to the smallest circumference C of the cop chase. A' represents the circle described by the point of the traveler when winding on to the largest circumference of the cop chase. It will be seen that the direction E of the thread makes nearly the same angle with the tangent G H to the circle A that the direction E' of the thread makes with the tangent G' H' to the circle A' so that the resistance of the traveler B to motion round both the circles A and A' will be nearly equal, and consequently the tensions of the thread will be nearly equal also in both cases, and the same condition will obtain for all intermediate positions of the traveler between the circles A and A' and of the winding on between the circles C and C'.

The traveler, or the point thereof through which the yarn is passed, or round which such yarn is wound on its way to the spool or spindle, may be moved toward and away from the center of the spindle as the diameter of the cop varies by means of arrangements such as those shown in Figs. 3, 4, 5, 6, 7 and 8 for example.

Figures 4, 6:
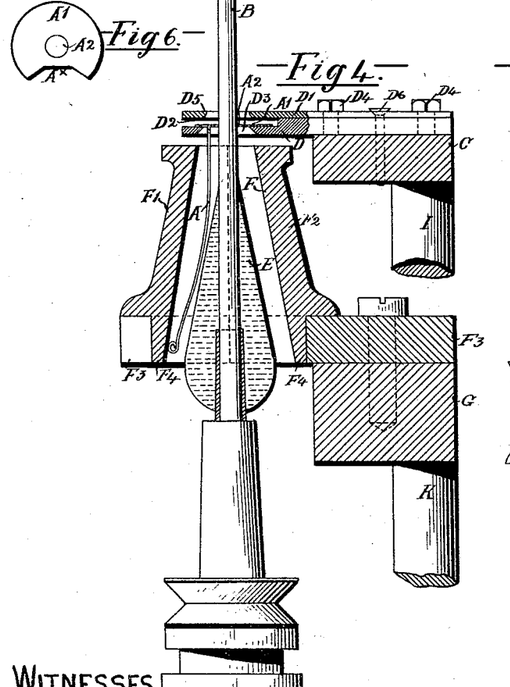
Fig. 4, a transverse sectional elevation of same.
Figs. 6, 7 and 8, detail views in connection with same.
Figure 5:
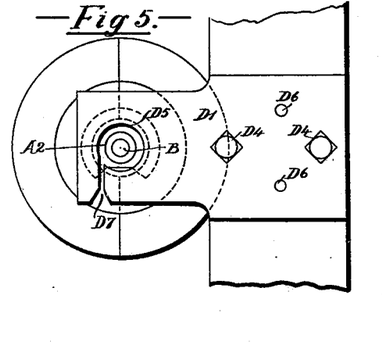
Fig. 5, a plan of same.
Figures 7, 8:
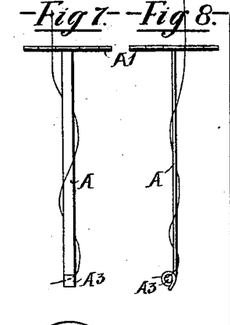

The traveler A is composed of a piece of wire as shown in Fig. 8, of a piece of sheet metal as shown in Figs 4 and 7, or other suitable material, the upper end of which is provided with a disk A' or other suitable part provided with a hole $A^2$ adapted to take over the upper part of the spinning spindle B, or in some cases over the upper part of the dead spindle or stud on which the spinning spindle or tube revolves, in such manner that the said traveler A is free to rotate round the said spinning or dead spindle, as the case may be, and to rise and fall thereon to the extent necessary for the formation of the conical layers of yarn forming what is called the chase of the cop and to rise gradually thereon to the extent necessary for the formation of the entire cop. The traveler A is carried by a bar C through the medium of bearing plates D D' or other suitable devices in such manner that while being free to rotate round the spindle B as aforesaid, it can be raised and lowered to the required extent by the said bar C and bearing plates D D'. The said bearing plates are constructed as follows:—D is a plate the front end of which has a recess $D^2$ formed therein to receive the disk A' of the traveler, and a hole $D^3$ through which the spindle B and the stem of the traveler pass. D' is a cover plate secured to the plate D by two screws $D^4$ and having a hole $D^5$ in it for the passage of the spindle B. The cover plate D' prevents the disk A' from rising out of the recess $D^2$ but leaves the disk A' of the traveler perfectly free to rotate in the said recess, round the spindle B. The disk A' being placed between the plates D and D' is caused to follow the up and down movements of the said plates and of the bar C to which the same are attached by steady pins $D^6$ or other means which allow of the easy removal of the plates from the bar C when it is required to piece up broken threads. A slit $D^7$ is formed through the two plates D D' to facilitate the passage of the thread or yarn into the annular space round the spindle B, and thereby into the notch or opening $A^\times$ in the disk A' of the traveler.

At or near its lower end the traveler A is provided with an eye or loop $A^3$, see Figs. 4, 7 and 8, through which the yarn is passed on its way from the drawing rollers to the bobbin, spool or cop E. The lower end of the traveler passes into the interior of a truncated conical ring or shaper F which is supported by the bar G in a position concentric with the spindle B. As the lower end of the traveler is carried round by the tension or drag of the yarn in the conical ring F the centrifugal force generated in the traveler A forces the said lower end thereof outward against the internal conical surface of the said ring, and the friction of the said lower end of the traveler against such conical surface produces the desired tension or drag on the yarn to effect the winding on of the same onto the bobbin, spool or spindle. The smaller and larger ends of the conical ring F are placed so as to correspond respectively with the smaller end or nose and with the larger end or base of the chase of the cop, so that as the traveler A is raised or lowered within the said cone during the process of winding a layer of yarn onto the chase of the cop, the lower end of the traveler follows the internal surface of the conical ring by the action of centrifugal force, and is moved outward as the winding diameter increases, and inward as that diameter decreases, whereby the tension or drag of the yarn is maintained sufficiently uniform whatever the diameter which is being wound onto.

It will be understood that the traveler A is carried round by the tension or drag of the yarn in the conical ring or shaper F, that the weight of the said traveler is carried by the bar C and plate D or other suitable support that may be provided, that the traveler is free to turn independently of the spindle B, that the tension or drag of the yarn is produced by the friction of the lower end of the traveler A against the inner surface of the conical ring F, such friction being produced by the centrifugal force of the stem of the traveler as the same revolves in the said ring or shaper, and that the movement of the part of the traveler which forms or carries the guide for the thread of yarn toward and away from the spindle is effected by the joint action of the conical ring or shaper and the centrifugal force of the traveler.

In the arrangement above described I prefer that the spinning spindle B shall remain at a constant level, and the conical ring F and traveler A be gradually raised as the cop increases in length, the traveler A having, besides the said gradual rising movement, the up and down or traversing movement necessary to form the chase. The movements of the traveler may be effected by apparatus of the kind usually employed in ring spinning machines for imparting similar movements to the ordinary ring and traveler; but as the cone has only to be raised as the cop increases in length, its movement may be effected by the modified apparatus shown in Figs. 9, 10 and 11.

Figures 9, 9A, 14, 18:
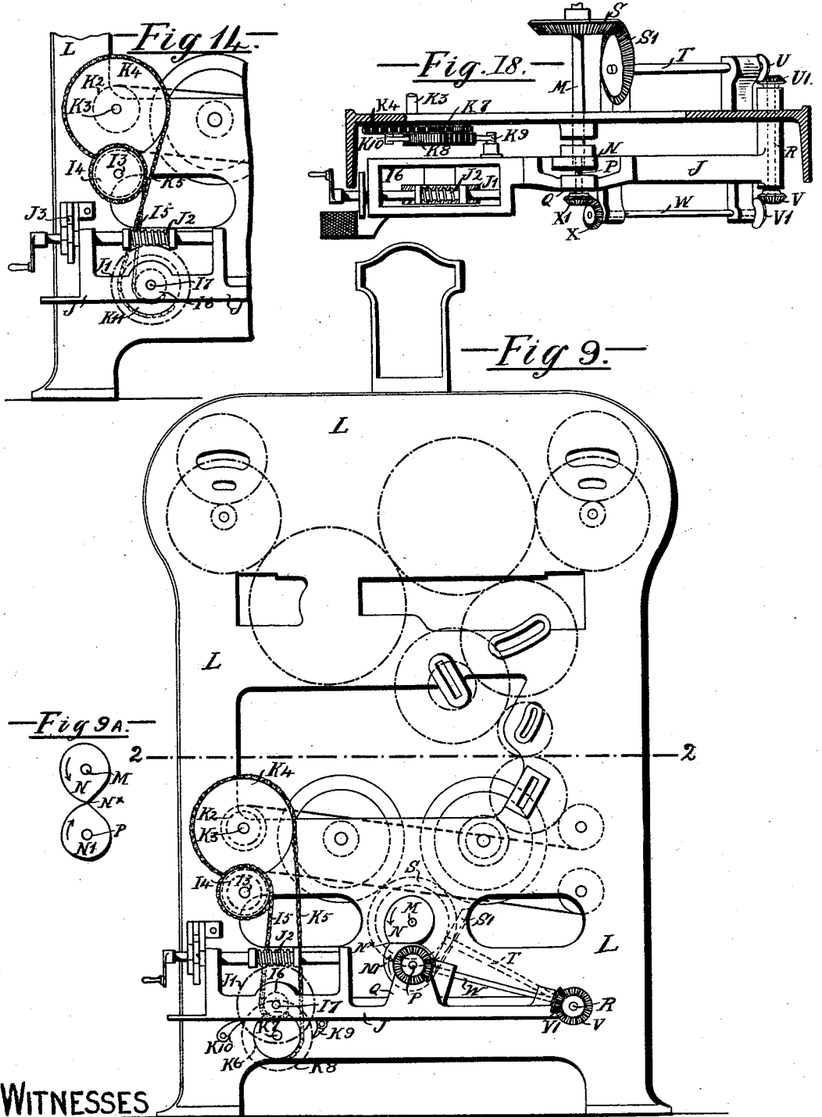
Figure 10:
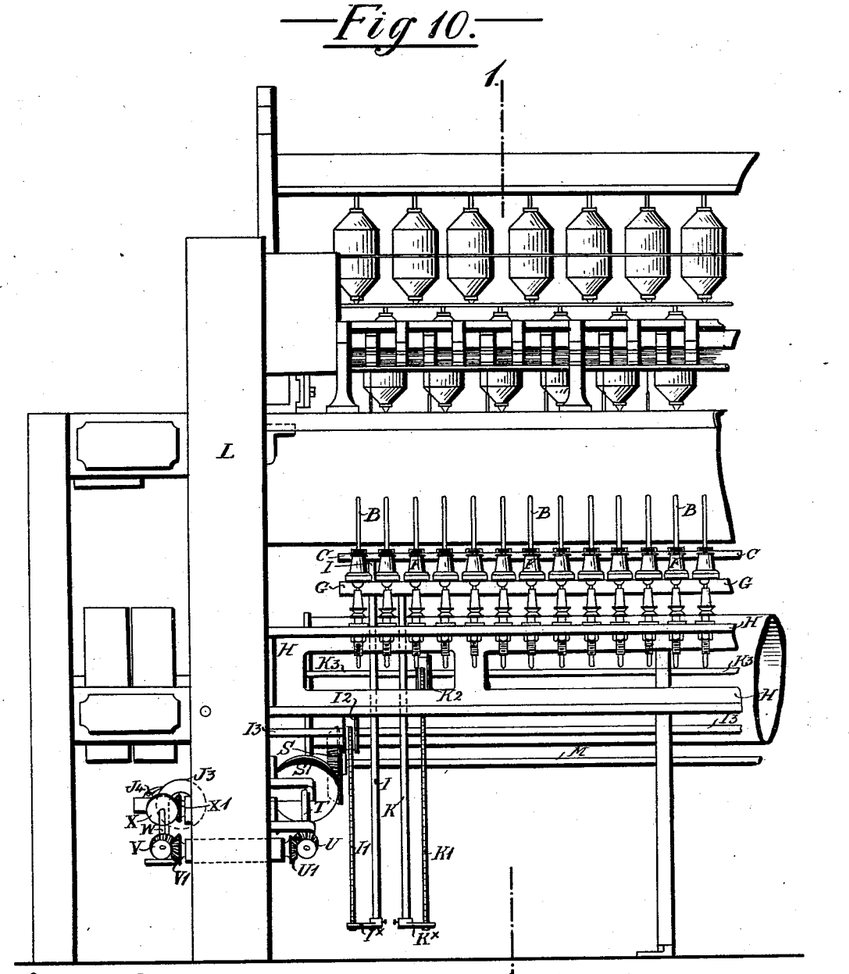
Fig. 10 is a front elevation of part of such a machine.
Figures 11, 15:
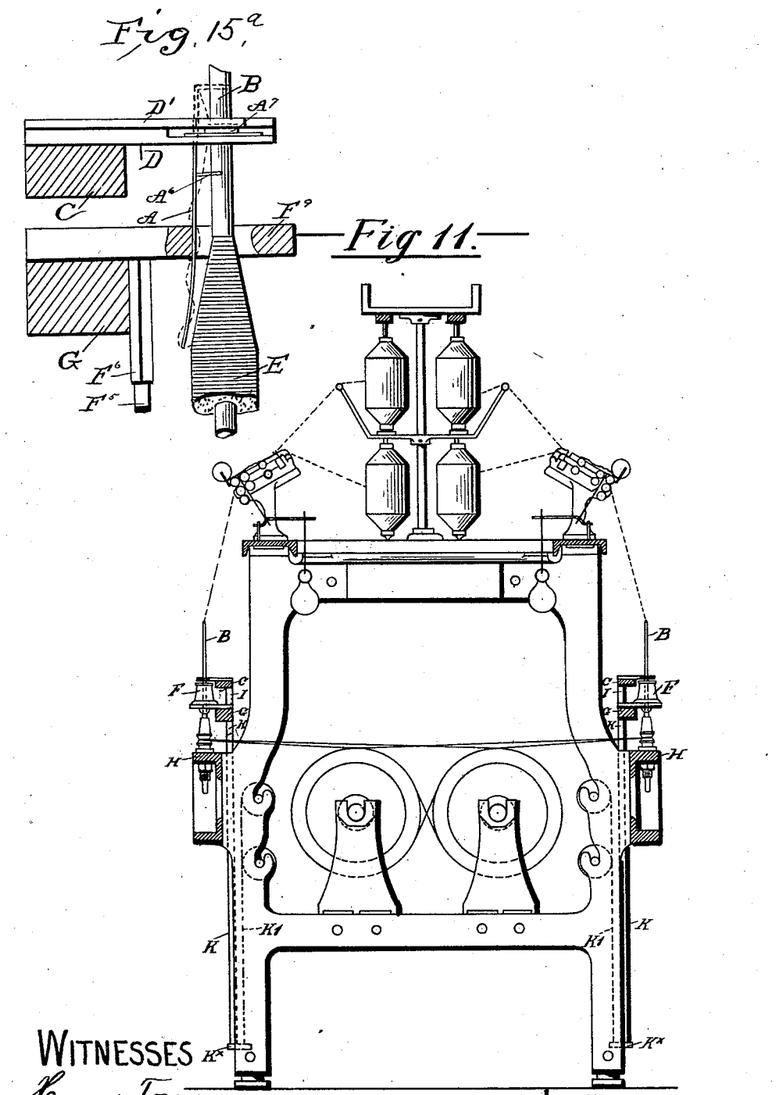
Fig. 11 is a section on line 1—1 of Fig. 10.
Fig. 15 is a sectional view of a modification.

The bar C, carrying the plates D D' supporting the travelers, is carried by a series of rods sliding vertically in guides on the spindle rail H. I shows one of such rods. $I^x$ is a cross-head or arm secured to the lower end of the rod I. I' is a chain, one end of which is secured to the arm $I^x$ and the other end to a drum $I^2$ fixed on a shaft $I^3$ revolving in bearings in the frame of the machine.

$I^4$ is a drum secured to the shaft $I^3$, and $I^5$ is a chain fixed at one end to the drum $I^4$ and at the other end to a drum $I^6$ fixed on the shaft $I^7$ turning in bearings in the building-motion lever J. This drum $I^6$ receives a step by step rotatory motion each time the building-motion lever J descends, through the medium of the worm wheel J', worm $J^2$, ratchet wheel $J^3$ and pawl $J^4$ in a manner well understood in connection with this class of machinery. This step by step rotatory motion of the drum $I^6$ causes the chain $I^5$ to be gradually wound on to it and this turns the drum $I^4$, shaft $I^3$ and drum $I^2$ whereby the chain I' is gradually wound on to the latter, drawing up the rod I and bar C by an amount equal to the thickness of one thread of yarn, more or less, after each wind-on. The upward traversing motion of the traveler, during the winding on from the base of the chase of the cop to the nose thereof, is effected by the quick downward movement of the building motion lever J produced by the action of the ordinary heart cam or by the action of my improved cams N N' to be hereinafter described. The downward motion of the lever J pulls the chain $I^5$ which turns the drum $I^4$, shaft $I^3$ and drum $I^2$, winding the chain I' on the drum $I^2$ and drawing up the rod I and consequently the bar C, plates D D' and the travelers carried by them. The slower upward movement of the building-motion lever allows the bar C and plates D D' to fall, their superior weight acting to carry the travelers downward in the rings F and to push down the rod I and thereby to return the drum $I^2$, shaft $I^3$ and drum $I^4$ to their former positions. It will be understood that each of the rods I is provided with its arm $I^x$, chain I' and appropriate drum $I^2$.

The bar G carrying the conical rings F is carried by a series of rods sliding in guides on the spindle rail H. K shows one of such rods. $K^x$ is a cross-head or arm secured to the lower end of such rod K. K' is a chain, one end of which is secured to the arm $K^x$ and the other end to a drum $K^2$ fixed on a shaft $K^3$ revolving in bearings in the frame of the machine. $K^4$ is a drum secured to the shaft $K^3$, and $K^5$ is a chain fixed at one end to the drum $K^4$ and at the other end to a drum $K^6$ turning on a stud $K^7$ fixed to the side frame L of the machine. Connected to the drum $K^6$ is a ratchet wheel $K^8$ which is operated to the extent of one or more teeth each time the building motion lever J descends by a pawl $K^9$ carried thereby. A retaining pawl $K^{10}$ carried by the side frame L prevents the ratchet wheel $K^8$ from turning backward. The step by step rotatory motion of the ratchet wheel $K^8$ and drum $K^6$ pulls the chain $K^5$ which turns drum $K^4$, shaft $K^3$ and drum $K^2$, drawing up the rod K and consequently the bar G and the conical rings F by means of the chain K' to an extent equal to the thickness more or less of a thread of yarn after each winding on operation. It will be understood that each of the rods K is provided with its arm $K^x$, chain K' and appropriate drum $K^2$.

It will be understood that in order to accomplish the desired result it is only necessary that the relative positions of the conical ring, the traveler and the cop be changed as the winding proceeds and although I have indicated one way in which this relation may be varied I do not wish to be limited thereto.

For convenience in piecing-up broken threads of yarn during the process of spinning, the aforesaid conical ring F may be made in two halves F' and $F^2$, the front half F' being adapted to be removed to give access to the bobbin, spool or cop which is being formed, and to facilitate the removal and replacing of the entire conical ring, or more especially of its front part, the said conical ring may be supported in a spring socket $F^3$ attached to or forming part of the bar G which carries the said rings. This spring socket may consist of a part bored out cylindrically to receive a corresponding cylindrical part $F^4$ of the conical ring, such cylindrically bored part being split at $F^{50}$ so that it will spring slightly to admit of the insertion into it and removal therefrom of the half, or the whole if need be, of the said conical ring, but will hold the same firmly when inserted thereinto.

To facilitate the doffing or removal of the completed cops from the spindles, the travelers and the conical rings are raised by means of their carrying bars C and G to a sufficient height above the tops of the spindles to admit of the cops being drawn off the same without coming in contact with the said rings or travelers which are then turned to their lowest positions for the commencement of a fresh set of cops.

Figures 12, 13, 13A:
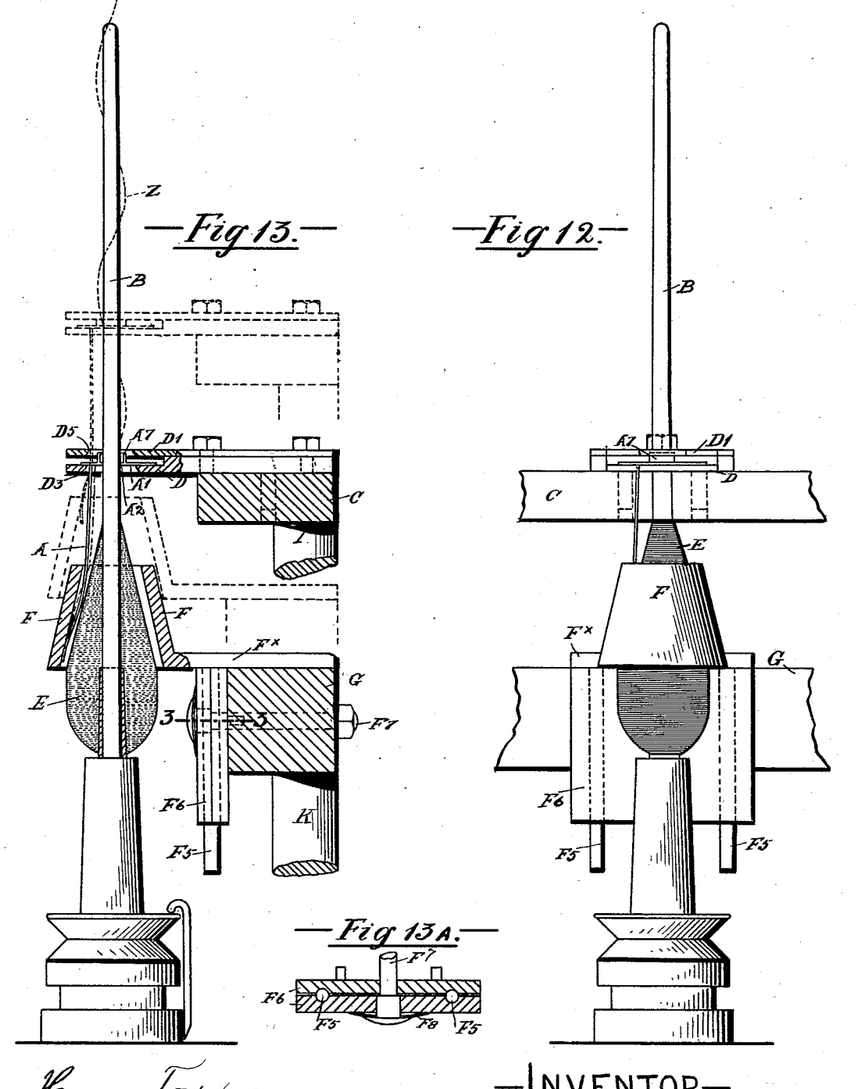

Instead of the conical ring or shaper F be-being made of the same or somewhat greater height than the chase of the cop as shown in Fig. 4, it may be made of less height as shown in Figs. 12 and 13. The diameters at top and bottom remain the same as would be used if the ring were made of the same height as or slightly greater height than the cop chase; and instead of leaving the ring stationary during the time the traveler A rises or falls in it to wind on a layer of yarn, the said comparatively shallow conical ring or shaper F (Figs. 12 and 13) is made to rise and fall with the traveler but at a speed and to a distance so proportioned to the rise and fall of the traveler that when the latter is winding on to the largest diameter of the cop chase it shall bear against the corresponding larger diameter of the conical ring as shown in full lines in Fig. 13, and when the traveler is winding on to the bare spindle or on to the smallest diameter of the cop chase it shall bear against the corresponding smaller diameter of the conical ring as shown in dotted lines in Fig. 13, and similarly for all intermediate points of the chase of the cop, that is to say that the traveler shall always bear upon that part of the internal surface of the ring which corresponds to the part of the chase on which the yarn is being wound at any given moment.

The requisite rising and falling movements of the conical ring or shaper F may be effected by the arrangement shown in Fig. 14 which is a reproduction of so much of Fig. 9 with certain of the parts modified as is necessary to elucidate the arrangement about to be described. Instead of the lower end of the chain $K^5$ being connected to a drum $K^6$ turning on a stud on the frame L as shown in Fig. 9, it is connected to a drum $K^{11}$ fixed by the side of the drum $I^6$ on the shaft $I^7$ turning in the building-motion lever J. The drum $K^{11}$ therefore receives the same step by step motion as the drum $I^6$ by means of the worm wheel $J'$, worm $J^2$ and ratchet wheel $J^3$ for the purpose of raising the bar G carrying the conical rings, as the cop increases in height. But the up and down motions of the said bar G, so as to follow those of the traveler bar C, are effected in the same way as the up and down motions of the latter, that is to say, the upward motion of the bar G and conical rings F carried by it is effected by the descent of the building motion lever J which draws down the chain $K^5$, turning the drum $K^4$, and thereby the drum $K^2$ which, by the chain $K'$ and rods K, lift the bar G; and the downward motion of the bar G is effected by its superior weight which assists that of the bar C to draw up the building-motion lever J when and as the building-motion cam allows the latter to rise. The slower and shorter motion of the conical rings F as compared with that of the travelers A is caused by the drums $K^4$ and $K^{11}$ being proportionally larger than the drums $I^4$ and $I^6$. In the drawings $K^4$ is shown twice the diameter of $I^4$ so that the conical rings rise and fall in that case half the distance and at half the speed of the travelers. By making the ring of smaller height than the chase of the cop, and causing it to move in the manner described, the piecing up of the thread when it breaks, is facilitated, because the cop chase being longer than the conical ring a part or parts of the former must always be outside the latter, namely either standing above it, below it, or partly above and partly below it; and this frequently enables the broken end of thread on the cop chase to be got hold of without removing the conical ring, but to enable the end of the thread to be got hold of at any time the conical ring F may be mounted by its foot $F^x$ on one or more stems or guide rods $F^5$ which slide in clips $F^6$ attached to the lifting bar G by means of a bolt $F^7$, see Figs. 13 and $13^A$, the latter of which is a sectional plan of the said clips taken on line 3—3 of Fig. 13. A spring $F^8$ is placed under the head of the bolt $F^7$ which spring presses the parts of the clip $F^6$ against the stems $F^5$ with an elastic pressure that holds the conical ring steady while enabling it to be raised up clear of the chase of the cop so as to expose the whole surface of the latter to inspection for the finding of the end of the broken thread without actually detaching the ring from the bar G.

Instead of the conical ring or shaper for moving the end of the traveler toward and away from the center of the spindle similar effect may be produced by the arrangement shown in Fig. 15 in which the stem of the traveler A passes through a plain ring $F^9$ and the centrifugal force urges the free end of the traveler away from the center of the spindle B so that the said stem of the traveler tends to stand obliquely to, or at an angle with, the axis of the spindle, but is restrained by the inner circumference of the aforesaid ring. When the traveler is raised its oblique or diverging stem is closed in by the ring $F^9$ so that the end of the traveler is moved inward toward the center of the spindle B and when the traveler is lowered its stem is allowed by the ring to diverge again or open out under the centrifugal action so that its end is moved away from the spindle. The ring may be arranged to remain stationary while the traveler rises and falls in it as in the case of the conical ring in Figs. 3 and 4, or it may be arranged to rise and fall to a smaller extent and at a slower speed than the traveler as in the case of the shortened conical ring in Figs. 12 and 13.
In some cases when the travelers are formed at their lower ends as shown in Figs. 7 and 8, the tension or drag of the thread cannot exert such an effect on the said lower ends as will cause the travelers to rotate with certainty round the spindles, and such travelers are therefore liable, under certain circumstances, to jam and to break the yarn. To obviate this defect the travelers are constructed so that their stems are subjected to a torsional or twisting action which facilitates their rotation round the spindle. This is accomplished by making the part $A^4$ of the traveler, (see Fig. 16) which bears against the inner surface of the ring, of comparatively great breadth and preferably curved (as shown in the sectional plan views below each example in Fig. 16) to correspond more or less to the curvature of the inner surface of the ring in contact with which it revolves. The broad part of the traveler may be arranged to extend more or less on each side of the stem A of the traveler or wholly on one side or the other thereof. The yarn is passed through guide holes or notches in the traveler or wound round the arms thereof as shown in order to secure the required tension. By this arrangement the broadened part $A^4$ of the traveler acting against the internal surface of the ring causes the stem of the traveler to be subjected to a torsional, twisting, or guiding action which facilitates the rotation of the whole traveler round the spindle. The guide holes $A^5$ in the traveler shown at the right hand of Fig. 16 and the winding of the yarn round the arms in the other travelers shown in that figure, prevent the yarn from becoming displaced or from slipping off the traveler when the latter is raised and lowered during the process of doffing the completed cops and commencing a fresh set.

Figures 15, 16, 17:
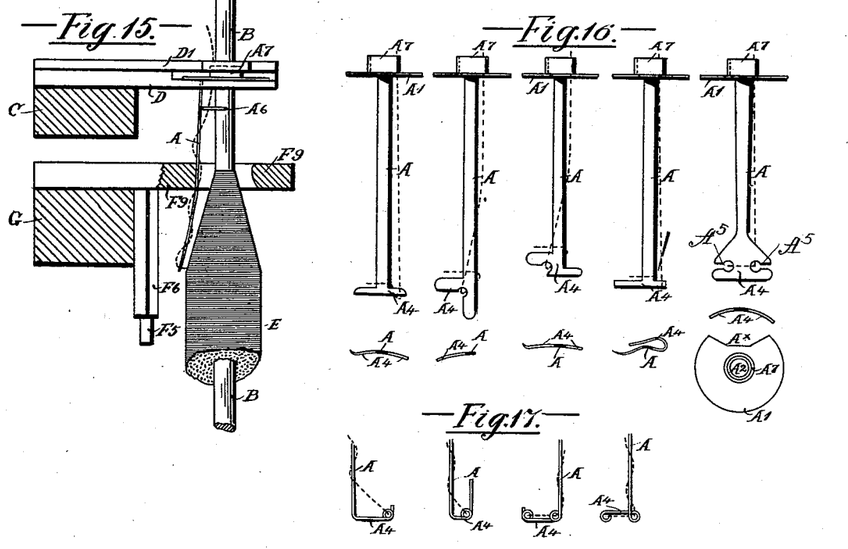
Figs. 16 and 17 illustrate various forms of carriers.

Fig. 16 shows the above described broadened ends as applied to the stems of travelers made of sheet metal. Fig. 17 shows how the lower ends of traveler stems made of wire may be constructed with broadened ends for the same purpose.

To further steady the traveler and to facilitate its turning round the spindle when pulled by the yarn, I sometimes furnish it with a finger $A^6$ projecting from the stem A and bearing against the spindle, or in some cases against the spun yarn itself on the side opposite to that from which the thread of yarn pulls the traveler, see Fig. 15, or a similar finger may be applied on an extension of the traveler stem A beyond the disk $A'$ as shown in dotted lines in Fig. 15$^A$, but in that case the finger is made to bear against the same side of the spindle or tube as that from which the yarn pulls the traveler.
When it is required to doff or remove the finished cops from the spindles, the travelers A are raised by their lifting bar C and bearing plates D D' clear of the spindles B and the holes $A^2$ in the heads or disks $A'$ of the travelers are liable to be displaced and to become eccentric with regard to the spindle and consequently when the travelers are lowered again to commence the spinning of a fresh set of cops, the spindles, or some of them, do not enter the said holes until the heads or disks $A'$ are moved by hand or otherwise to bring the holes coincident with the spindle. To obviate this inconvenience the recess in the plate D in which the disk $A'$ of the traveler rotates may be made circular and of such a size that the said disk can turn freely therein and is prevented thereby from assuming a position in which the hole $A^2$ in it could be materially eccentric to the spindle. But I prefer to form a short tube or flange $A^7$ (see Figs. 12, 13, 15 and 16) round the said hole $A^2$ in the head $A'$ of the traveler projecting either upward or downward, or both, the said tube or flange taking into the hole $D^5$ or $D^3$ in the bearing plate D or D' or into both holes as the case may be, whereby the concentricity of the hole $A^2$ with the spindle is preserved whether the latter is actually in the hole $A^2$ or not.
The part of my invention above referred to has been described in connection with the spinning and formation of cops with the chases upward; but I do not wish to limit myself to this particular position as this may be varied if desired.

In spinning frames generally in which the yarn is wound on to bobbins or spools, or more especially when wound on the bare spindles in cop form it is desirable, after having wound a layer of yarn on to the chase from the nose to the base thereof, to return the yarn to the nose in order to commence the winding on of a fresh layer of yarn, as quickly as possible, not only to prevent the undue accumulation of yarn at the nose of the chase (which tends to prevent the proper "readying" of the cop) but also to impart lateral strength to the cop by causing the yarn on its return from the nose to the base or vice versa to lay on the chase at a considerable angle across the last layer of yarn that has been wound on to it. In order to effect this quick return of the yarn to the nose of the cop it is necessary that the point of the lever or other device acted on by the cam which effects the said return of the yarn should be somewhat in the form of a knife edge to prevent the dwell while passing the point of the cam, which is produced by the use of a friction roller between the said lever and the said cam, and consequently the said knife edge and cam are subjected to considerable friction and consequent wear and tear. This wear and tear renders it practically impossible to dispense with the friction roller and consequently the desired quick return cannot be effected by the arrangements at present in use. The object of the second part of this invention is to obtain the necessary quick return without the wear and tear due to the use of a knife edge, and for this purpose I employ the following arrangement:

Instead of constructing the cam so that it will give the entire range of motion required, I construct it so that it will give say half the motion required, and arrange to operate with it another similar cam adapted to give the other half of the motion required. The second cam is mounted on a stud or shaft which is free to move to or from the center of the stud or shaft carrying the first mentioned cam, and is connected by suitable means with the part to be moved. The two cams are arranged and geared together so as to revolve with corresponding parts of their two peripheries in contact with each other, the one cam being free, as before stated, to advance toward the axis of the other or to recede therefrom according as the radii of the parts in contact decrease or increase. The peripheries of the two cams thus roll together with little or no sliding friction, and consequently little or no wear and tear, each cam giving or allowing one half of the motion in either direction of the traversing rail or other part to be moved. It will be understood that the cams effect the motion of the said part in one direction and one or more springs or weights or other suitable devices effect the motion in the other direction, the said springs or weights or other suitable devices also keeping the cams in contact with one another as they revolve.

One method of applying the above described arrangement of cams to the building motion lever of a spinning machine is shown in Figs. 9, 10 and 18, Fig. 18 being a sectional plan taken through the side frame L on line 2—2 of Fig. 9 but with the tin drums and certain parts of the gearing removed for the sake of clearness. M is the shaft that usually carries the heart cam. N is a cam mounted on the shaft M but arranged to give only half the amount of movement required to be imparted to the building motion lever J. N' is a cam similar to the cam N but mounted on a short shaft P turning in bearings in the bracket Q of the lever J. The cams N and N' revolve in opposite directions as shown by the arrows, and motion is communicated from the shaft M to the shaft P by the following means:—Motion is communicated from the shaft M to the shaft R revolving in a bearing in the side frame L, by means of the bevel wheels S S', shaft T and bevel wheels U U'. From the shaft R motion is communicated to the shaft P by the bevel wheels V V', shaft W, and bevel wheels X X'.

In Fig. 9 the building motion lever J and the cams N N' are shown in the position they respectively occupy at the moment when the yarn is at the base of the chase of the cop and the quick traverse from the base to the nose is about to commence. The cams N and N' are in contact at their smallest radii and as they revolve in the direction of the arrows their points $N^x$ roll together, the radii in contact rapidly increasing so that the shaft P and consequently the building motion lever J are forced quickly downward, raising the traveler bars C until the points $N^x$ of maximum radius of the cams come in line with the centers of the shafts M and P as shown in Fig. $9^A$, by which time the yarn has been raised up to the nose of the cop. It will be seen that this operation will have occupied about one eighth of the revolution of the cam shafts M and P but this may be varied as desired. The remaining seven eighths of a revolution of the shafts returns the cams N N' to the position shown in Fig. 9, and the traveler rail C descends slowly during that time by reason of the gradual reduction of the radii at the points of contact of the cams N and N', allowing the building motion lever J to be raised by the superior weight of the traveler bars C; the depression of the latter carrying the yarn slowly from the nose to the base of the cop during the winding on and the rise of the building motion lever J, keeping the two cams N N' in contact.

I claim—

1. In combination, the bobbin spindle, the traveler arranged to carry the thread about the same, and guiding means for the traveler operating upon the same to move it toward and from the bobbin spindle, substantially as described.

2. In a spinning machine the traveler, the conical guide ring and means for moving one of said parts vertically in relation to the other combined with the bobbin spindle about which the traveler lays the yarn and toward which the guide ring moves the traveler, substantially as described.

3. In a spinning machine, the traveler, the guide ring, and means for moving one of said parts vertically in relation to the other combined with the bobbin spindle about which the traveler lays the yarn and toward which the guide ring moves the traveler, substantially as described.

4. In combination, the bobbin spindle, the traveler, the guide ring, means for moving the traveler vertically in relation to the bobbin spindle, means for moving the guide ring vertically in relation to the bobbin spindle to correspond to the growth of the bobbin, said operating means acting also to move the traveler and guide ring in relation to each other, substantially as described.

5. A traveler for spinning frames comprising a bearing adapted to turn in a horizontal plane, a stem depending therefrom to one side of the axial line of the bearing, said stem having at its lower end a projecting portion extending substantially concentric to the axial line and a guide for the thread, substantially as described.

6. A traveler adapted to lay yarn about a bobbin spindle and the like, consisting of a stem having an upper bearing for connection with its support, a lower guiding bearing for the yarn and having a steadying finger $A^6$, substantially as described.

7. In combination, the bobbin spindle, the traveler, the guiding ring for said traveler having the rods $F^5$ and the spring clasp for holding the ring, comprising the clips $F^6$ and the yielding means for holding them together, substantially as described.

8. In combination, the bobbin spindle, the traveler arranged to lay the thread about the bobbin, one of said parts being movable, the means for operating the said movable part in relation to the other whereby the yarn will be wound up and down on the bobbin, said means including the building motion lever, the cam carried thereby, the revolving shaft M, the cam N carried thereby and engaging the cam on the building motion lever, the means for operating the cam on the building motion lever and the driving connections from the building motion lever to the said movable part for winding the yarn up and down on the bobbin spindle, substantially as described.

9. In combination, the bobbin spindle, the traveler, the guiding ring for the traveler formed in sections with means for clamping the sections together and holding the ring in place.

10. In a spinning frame, the traveler, the guide ring and means for moving one of said parts vertically in relation to the other, combined with the bobbin spindle about which the traveler lays the yarn, said guide ring being of less height than the conical part of the bobbin, substantially as described.

11. In a spinning frame, the guide ring, the traveler and the means for moving one of said parts vertically in relation to the other, combined with a bobbin spindle about which the traveler lays the yarn, said traveler consisting of the stem having a bearing for attachment to its support and a broadened lower end $A^4$ bearing on the interior of the guide ring, substantially as described.

In testimony that I claim the foregoing as my invention I have signed my name in presence of two subscribing witnesses.

PHINEHAS PEARSON CRAVEN.

Witnesses:
HARRY TONER,
15 *Barton Street, Moss Side, Manchester.*
FRANKLIN HOWARD CRAVEN,
16 *Devonshire Street, Ardwick, Manchester.*